W. L. COLE.
SHIP'S DECK STRUCTURE, BULKHEAD STRUCTURE, AND THE LIKE.
APPLICATION FILED JULY 21, 1917.
1,290,092.
Patented Jan. 7, 1919.
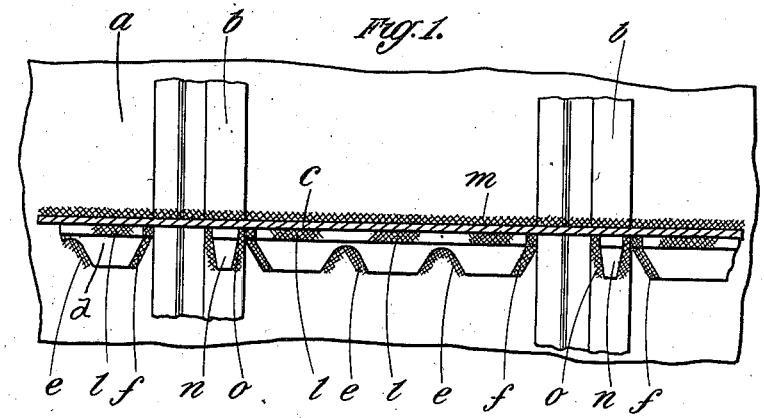
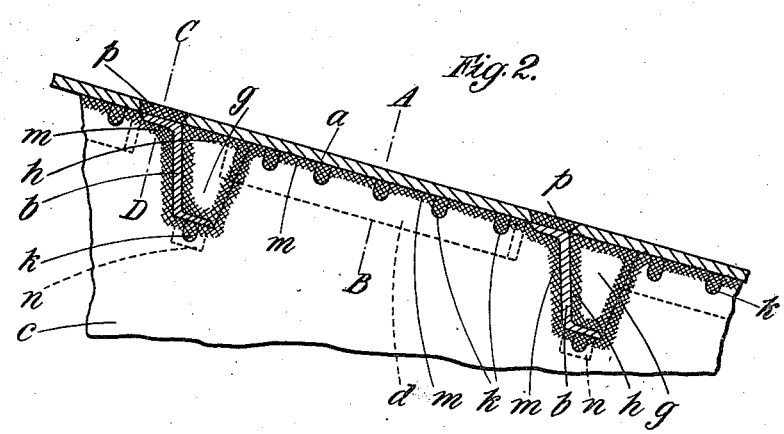
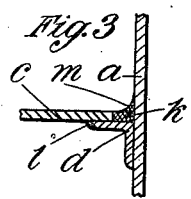 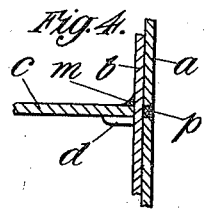 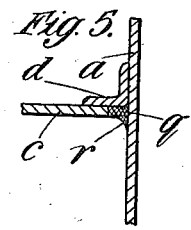
INVENTOR
William Lawes Cole
by
Kenyon & Kenyon
his Attorneys

UNITED STATES PATENT OFFICE.

WILLIAM LAWES COLE, OF EAST LONDON, ENGLAND, ASSIGNOR TO QUASI-ARC COMPANY, LIMITED, OF LONDON, ENGLAND.

SHIP'S DECK STRUCTURE, BULKHEAD STRUCTURE, AND THE LIKE.

1,290,092.                Specification of Letters Patent.         Patented Jan. 7, 1919.

Application filed July 21, 1917. Serial No. 181,976.

*To all whom it may concern:*

Be it known that I, WILLIAM LAWES COLE, a subject of the King of England, and residing at Clinton Road, Mile End, East London, England, have invented certain new and useful Improvements in Ships' Deck Structures, Bulkhead Structures, and the like, of which the following is a specification.

This invention relates to deck constructions, bulkhead constructions and the like. In ship construction there are always frame members usually of channel- or of Z-section at intervals of about two or three feet apart inside the plating of the sides, and in order to build in the deck it is necessary to cut the deck so as to fit over the frame members. Angle-iron collars are forged to fit inside the channels of the frame members, around said members, and along the plating between them, the collars being riveted to the ship's plating and the frame members, and riveted also to the decks. It is usually required to make bulkheads and partitions also to fit against the ship's sides in the same way by the use of angle-irons fitted around and between any brackets and stringers, and riveted to the plating and the bulkheads. Then it is necessary to make such decks and bulkheads watertight by calking the joint lines between these and the decks, and all the rivet heads, but even so it is almost impossible to calk every joint effectively, particularly around the longitudinal stringers and so forth. The result is that there is always a certain amount of leakage which may steadily become worse, owing to the inevitable relative movements due to the working of the ship, and also creaking is liable to occur due to relative movements, particularly against and around the frame members. It is the object of the present invention to provide an alternative method of fitting and fixing decks, bulkheads and the like in ships, which will overcome these disadvantages with a notable saving in labor, material and deadweight. This result is attained according to this invention by a method involving the use of fusible electrodes which form deposits of welding metal. The employment of electric welding with fusible electrodes for uniting the plates of a ship or for connecting a ship's plating to the frame, bulkheads, watertight bulkheads and so forth has been previously proposed, but the present invention relates to a particular method of effecting the welding with the use of such fusible electrodes, and to a modified method of constructing or fitting the decks and bulkheads which is employed so as to render the welding method a practical one.

The improved method of constructing and fitting a deck in a ship according to the present invention will now be described with reference to the accompanying drawings, wherein:—

Figure 1 shows in elevation a portion of the plating at the side of a ship and a portion of the deck in section, while Fig. 2 shows a plan view of Fig. 1;

Fig. 3 is a detail view showing a section on the line A—B of Fig. 2;

Fig. 4 shows a section on the line C—D of Fig. 2; and

Fig. 5 is a detail view similar to Fig. 3, illustrating a modification.

In the drawings, $a$ is the ship's plating, for example at one side of a ship, $b$ are the frame members extending upwardly and downwardly, and $c$ is the deck to be inserted. Between each frame member and the next an angle iron bracket $d$ is fitted, being held in position against the ship's plating $a$ by welding deposits as at $e$, Fig. 1, in notches cut in the vertical webs of the brackets, and by welding deposits $f$ at the chamfered ends of said brackets. One object of cutting the notches $e$ and welding up to the tips thereof, is to insure that the brackets $d$ are supported near the top, and will not therefore be liable to be torn away from the plating by any weight resting on the deck which in turn bears upon the projecting tops of the brackets. The notches may be cut in the webs of the brackets $d$, at intervals of say six inches apart, and they may be of any convenient shape, but an inverted V-shape with a rounded end is generally the most suitable in practice. The brackets are not required to extend at each end up to the upright frame members $b$, but they may be cut in lengths from straight angle bars so as to fill approximately the gaps between said frame members $b$. The tops of the brackets $d$ are at the level to support the deck directly. Small additional brackets $n$ may also be applied to the faces of the frame members $b$, at the same level as the angle iron brackets $d$ in order to support the deck at the faces of said frame members. The brackets $n$ are welded to the frame members $b$ by fillets of deposited metal $o$, as indicated in Fig. 1. The irregular internal sections of the frame members $b$ are filled in at the level of the deck $c$ with insertions $g$, Fig. 2, these being welded into the section of the frame members $b$ by fillets of welding metal $h$ around the inside of the said frame members and against the ship's plating $a$. The insertions $g$ when fitted in this way fill up the gaps in the frame members at the level of the deck $c$, leaving a plain or simple non-reëntrant section around which the deck can be fitted easily and closely. The deck may be assumed to be made up of metal plating which is riveted or welded together in any convenient manner. It may be treated as if it were a single plate for the purposes of this invention. When the deck is inserted it fits against the sides of the ship's plating and around the brackets $b$ and insertions $g$ as shown, and it is first welded down on to the tops of the brackets $d$, and the brackets $n$ also if desired, by welding deposits applied as at $k$ in notches or slots cut at convenient intervals in the edges of the deck, Fig. 2. Alternatively or in addition, the deck might be welded to the flanges of the brackets from beneath by fillets of welding metal deposited at $l$ in Fig. 3, but this is not generally necessary. Then a line or fillet of welding metal is deposited all around the edge of the deck as indicated at $m$, both against the ship's plating $a$ and around the brackets $b$ and insertions $g$. In this way the deck is completely welded and hermetically sealed in place in the ship, so that no subsequent calking or labor of any kind is required upon it to make it watertight.

Water might still find its way between the frames $b$ and the ship's plating $a$ (unless they were packed with jointing material which is not permanent), and in order to render impossible leakage of water at this point I prefer to cut slots in the plating $a$ from the outside adjacent to the frame members at the level of the decks, and to weld the frame members and plating together through such slots as at $p$. Figs. 2 and 4. In this way a complete line of welding is formed at the deck level along the ship's plating.

The brackets $d$ might be welded to the ship's plating $a$, if preferred, in an inverted position, as shown in Fig. 5, and the decks $c$ welded to the brackets $d$ from below, as at $q$, and also to the plating $a$ by a fillet weld as at $r$, but the arrangement shown in Figs. 1 to 4 is preferred.

The fitting of bulkheads in place is effected in exactly the same manner as for the decks, upright angle brackets being welded to the ship's plating, and the bulkheads being welded to such brackets and to the plating. If Figs. 1 and 2 are regarded as being turned through 90° they will represent the insertion of such a bulkhead, the frame members $b$ being then horizontal frame members which occur at intervals inside the ship's plating.

As the necessity for the drilling of rivet holes in fitting the decks and bulkheads is entirely eliminated, and as electric welding can be done by a single person whereas riveting requires the simultaneous labor of three men as a rule, it is evident that the new method of inserting the decks and bulkheads may introduce an important economy in labor, in addition to its other advantages.

Any suitable welding electrodes may be employed, but the electrodes of the kind set forth in the specification of Patent No. 1,144,390 to Arthur Percy Strohmenger for electric welding and fusion deposition of metals, issued June 29, 1915, is considered the best for the purpose. In the preferred process the electrodes are held with their ends close down to the work, and it is a spluttering or quasi-arc which passes.

Having now particularly described and ascertained the nature of my said invention and in what manner the same is to be performed, I declare that what I claim is:—

1. In ship construction, the combination of plates, frame members, brackets having the parts near the supporting flange thereof welded to the ship's plating and to the ship's frame members at a level to support the deck, a deck on said brackets, said deck being welded water-tight around its edges and to the brackets.

2. In ship construction, the combination of plating, supports attached thereto and having a supporting edge, said supports being attached to said plating by forming recesses extending toward the supporting edge thereof and welding the supports to the plating along the edge of the recesses.

3. In ship construction, the combination of plating, angle brackets attached thereto by forming recesses in the brackets extending toward the supporting edge of the brackets and welding the line defined by the recesses thereby attaching the brackets near the supporting flanges thereof.

4. In ship construction, plating, frame members, brackets having their web welded to the plating and to the frame members through the substantial width of the web, a deck welded to said plating, brackets and frame members so as to form a water-tight structure.

5. In ship construction, the combination of a deck and plates having slots therein where the frame members are applied thereto and at the level of the deck, frame members covering said slots and fillet welded to said plating by filling said slots to form a water-tight connection and brackets supporting said deck.

6. In ship construction, the combination of brackets welded to ship's plating at the level to support the deck, frame members, brackets on said frame members, said plating having slots formed therein where the frame members are applied thereto, and fused metal filling said slots to form a water-tight joint.

7. The method of attaching a relatively wide metal supporting member to another metal member which consists in making recesses in the first member extending to a point near the supporting edge thereof and welding the line defined by the recesses.

8. The method of securing angle supporting members to flat members which consists in forming recesses in the webs extending to a point near the supporting edge thereof, welding the line defined by one edge of the angle member along said recesses to secure the webs to the flat member near the supporting flanges of the angle members.

9. The method of ship construction which consists in welding brackets to the plating at a level to support the deck, placing the deck with notches therein in place on the brackets, welding the deck at the notches to the brackets and finally fillet welding the deck around its edges.

10. The method of inserting and securing in place in a water-tight manner, the decks and bulkheads of a ship, which consists in welding brackets substantially throughout the width of the web thereof to the ship's plating at a level to support the deck, placing the deck on said brackets and fillet welding the deck around the whole of its edge against the ship's plating or other frame members and also welding the deck to the brackets.

11. A method of fitting and securing in place decks and the like in a vessel, consisting in preparing brackets of a length less than the intervals between the frame members of the vessel, securing said brackets by welding to the plating of the vessel in the intervals between the frame members and in a position to support the deck to be fitted when welded to such brackets, welding into the cavities of the frame members insertions adapted to fill out said cavities to a plain section at the ultimate deck level, said insertions being so shaped and fitted as to fill up any reëntrant spaces in the frame members, cutting the deck plating to fit around the plain combined section of said frame members and insertions, welding the deck plating on to the brackets aforesaid, and applying a fillet of welding metal around the exposed edges of the deck plating.

12. A method of fitting and securing in place decks and the like in a vessel, consisting in preparing brackets of a length less than the intervals between the frame members of the vessel, such brackets being of angle section metal, cutting notches at intervals in the upright flanges of said brackets, welding the brackets to the plating of the vessel at a level to support the deck, by welding deposits formed in the notches of the upright flanges of the brackets, cutting the deck plating to fit around the frame members and against such brackets, and welding the deck plating to the brackets, to the plating of the vessel, and around the frame members of the vessel, by means of deposits of welding metal.

13. A method of fitting and securing in place decks and the like in a vessel, consisting in preparing brackets of a length less than the intervals between the frame members of the vessel, securing said brackets by welding to the plating of the vessel in the intervals between the frame members and in a position to support the deck to be fitted when welded to such brackets, cutting out the deck plating to fit around the frame members of the vessel and against the plating of the vessel, cutting notches in the deck plating at intervals in the portions thereof intended to bear against the brackets, applying the deck plating and welding it to the brackets by welding deposits in said notches, and applying a fillet of welding metal around the exposed edges of the deck plating.

14. A method of fitting decks and the like in a vessel in a watertight manner, consisting in securing brackets at intervals to the plating of the vessel in a position to support the deck plating, filling in by means of welding any reëntrant cavities in the deck plating to form a plain section at the deck level, applying the deck plating and welding the same to said brackets, to the plating of the vessel and to the frame members thereof by means of deposited welding metal to form a fillet of welding metal around the edge of the deck plating, cutting slots in the plating of the vessel in line with the deck and filling in such slots with welding metal in such a manner as to complete the line of welding along the edge of the deck plating.

WILLIAM LAWES COLE.